(12) United States Patent
Krapf et al.

(10) Patent No.: US 9,434,041 B2
(45) Date of Patent: Sep. 6, 2016

(54) MECHANICAL HAND TOOL DEVICE (75) Inventors: Reiner Krapf, Filderstadt (DE); Heiko Sgarz, Leonberg (DE); Ernie Fischer, Skokie, IL (US)

(73) Assignee: Robert Bosch GmbH, Stuttgart (DE)

( * ) Notice: Subject to any disclaimer, the term of this patent is extended or adjusted under 35 U.S.C. 154(b) by 745 days.

(21) Appl. No.: 13/877,132

(22) PCT Filed: Aug. 4, 2011

(86) PCT No.: PCT/EP2011/063426
§ 371 (c)(1),
(2), (4) Date: Jul. 3, 2013

(87) PCT Pub. No.: WO2012/041575
PCT Pub. Date: Apr. 5, 2012

(65) Prior Publication Data
US 2014/0020529 A1    Jan. 23, 2014

(30) Foreign Application Priority Data
Sep. 30, 2010  (DE) ........................ 10 2010 041 726

(51) Int. Cl.
G01S 13/88    (2006.01)
B23Q 17/24    (2006.01)
B25F 5/00     (2006.01)

(52) U.S. Cl.
CPC ............. B23Q 17/2433 (2013.01); B25F 5/00 (2013.01); *Y10T 83/04* (2015.04); *Y10T 83/141* (2015.04)

(58) Field of Classification Search
CPC ..... B23Q 17/2433; B25F 5/00; Y10T 83/04; Y10T 83/141; Y10T 408/21; Y10T 83/531; B23D 59/002; G01V 3/12

USPC ........... 342/22, 27, 61, 175; 408/16; 83/364, 83/520, 72
See application file for complete search history.

(56) References Cited

U.S. PATENT DOCUMENTS

| 8,272,813 | B1* | 9/2012 | Wise ...................... B23B 49/00 408/16 |
| 2004/0106916 | A1* | 6/2004 | Quaid ................ A61B 19/2203 606/1 |
| 2004/0265079 | A1* | 12/2004 | Dils .......................... B25F 5/00 408/16 |
| 2005/0078303 | A1* | 4/2005 | Murray .................. G01C 15/00 356/138 |
| 2009/0025233 | A1* | 1/2009 | Kaiser .................. B23D 49/167 30/392 |
| 2014/0020529 | A1* | 1/2014 | Krapf ...................... B25F 5/00 83/13 |
| 2014/0085144 | A1* | 3/2014 | Krapf ...................... B25F 5/00 342/385 |

FOREIGN PATENT DOCUMENTS

CN    1059742 C    12/2000
CN    100389939 C    5/2008
(Continued)

OTHER PUBLICATIONS

International Search Report corresponding to PCT Application No. PCT/EP2011/063426, mailed Nov. 9, 2011 (German and English language document) (7 pages).

*Primary Examiner* — John B Sotomayor
(74) *Attorney, Agent, or Firm* — Maginot, Moore & Beck LLP (57) ABSTRACT

The disclosure relates to a mechanical hand tool device, in particular a fret and/or a reciprocating saw device, including a locating unit having at least one antenna. The locating unit is configured to detect objects outside a workpiece and to detect objects inside the workpiece.

13 Claims, 6 Drawing Sheets

(56) References Cited

FOREIGN PATENT DOCUMENTS

| | | |
|---|---|---|
| CN | 100396990 C | 6/2008 |
| DE | 100 50 655 C1 | 1/2002 |
| DE | 10 2006 005 410 A1 | 8/2007 |
| DE | 10 2006 061 581 A1 | 7/2008 |
| DE | 102008055058 A1 * | 6/2010 ............. B23Q 17/22 |
| DE | 102008055067 A1 * | 7/2010 ............. B23D 51/02 |
| EP | 1 422 022 A1 | 5/2004 |
| WO | 96/37350 | 11/1996 |
| WO | 2004/061361 A1 | 7/2004 |
| WO | 2009/106164 A1 | 9/2009 |
| WO | 2010/072432 A1 | 7/2010 |

\* cited by examiner

MECHANICAL HAND TOOL DEVICE

This application is a 35 U.S.C. §371 National Stage Application of PCT/EP2011/063426, filed on Aug. 4, 2011, which claims the benefit of priority to Serial No. DE 10 2010 041 726.2, filed on Sep. 30, 2010 in Germany, the disclosures of which are incorporated herein by reference in their entirety.

BACKGROUND

The disclosure is based on a handheld machine tool apparatus as described herein.

A handheld machine tool apparatus has already been proposed for a handheld circular saw apparatus, having a locating unit which has a capacitive antenna and which is provided for the purpose of detecting the hand of a user outside the workpiece.

SUMMARY

The disclosure is based on a handheld machine tool apparatus, particularly a jigsaw and/or reciprocating saw apparatus, having a locating unit which has at least one antenna and which is provided for the purpose of detecting objects outside a workpiece.

It is proposed that the locating unit is provided for the purpose of detecting objects inside the workpiece. A "locating unit" is intended to be understood to mean particularly a unit which is provided for the purpose of ascertaining at least one piece of information about an object that is different than a workpiece. Advantageously, the locating unit ascertains at least a presence of the object in a locating space, particularly in a direction region of one of the antennas. Particularly advantageously, the locating unit ascertains at least one piece of information about a position of the object in the locating space. In particular, "provided" is intended to be understood to mean specifically programmed, designed and/or equipped.

In particular, the term "antenna" is intended to be understood to mean a unit which is provided for the purpose of sending and/or receiving a signal. Preferably, the signal is in the form of a magnetic field, in the form of an electrical field, in the form of another signal which appears meaningful to a person skilled in the art and/or preferably in the form of an electromagnetic field. In addition, the locating unit could have an ultrasound sensor and/or an optical sensor, particularly for locating between the sensor and the workpiece. Advantageously, the antenna comprises at least one element. Preferably, two or more antennas have the same element, that is to say that the antennas are at least to some extent of integral design. Advantageously, the locating unit has antennas for different fields and/or signals, as a result of which it is possible to achieve a particularly high level of reliability. Preferably, the locating unit could have an inductive antenna for live lines. In particular, an "element" is intended to be understood to mean an element of the antenna which radiates a power particularly for the purpose of locating. An "object inside a workpiece" is intended to be understood to mean particularly an object which is of separate design from the workpiece and is at least partially surrounded thereby. In particular, "objects outside the workpiece" are intended to be understood to mean objects which are arranged in front of or advantageously behind the workpiece. Preferably, objects outside the workpiece are not surrounded thereby. The locating unit is provided for the purpose of detecting objects which are arranged at an interval of more than 1 mm, advantageously more than 5 mm, from the workpiece. A "workpiece" is intended to be understood to mean particularly a unit which can be processed by an insertion tool, such as particularly a board made of plastic and/or advantageously wood. "At an interval" is intended to be understood to mean particularly that every point of the object is at a distance of greater than 1 mm from every point of the workpiece. The inventive refinement of the handheld tool apparatus allows particularly comprehensive and reliable protection to be achieved by means of a particularly simple design.

Furthermore, it is proposed that the handheld machine tool apparatus comprises a workpiece guide means having a workpiece support level, wherein the locating unit has a locating space which penetrates the workpiece support level, which allows particularly comprehensive protection to be achieved for an advantageous tool design. Preferably, the locating space is arranged at least to some extent behind the workpiece guide means as seen in a main working direction, specifically advantageously on a straight line that is parallel to the main working direction and that intersects the locating space and the workpiece guide means. Alternatively or in addition, the workpiece guide means could be designed to be able to be penetrated by the locating signal. Advantageously, at least one of the antennas emits a penetration signal. A "penetration signal" is intended to be understood to mean particularly a signal which is provided for the purpose of penetrating a workpiece which is mostly used with the handheld machine tool, particularly a wooden board, at least to some extent from one outer side to another outer side. Preferably, the penetration signal is provided for the purpose of penetrating at least one workpiece having a permittivity of between 1.5 and 4 and having a thickness of between 0.5 mm and 50 mm, advantageously between 2 mm and 25 mm, for locating purposes. A "workpiece guide means" is intended to be understood to mean particularly a means which is provided for the purpose of supporting at least one insertion tool mount on the workpiece so as to be able to move relative to the workpiece, specifically advantageously with a force in a direction which is oriented parallel to a motor-driven movement by the insertion tool mount. In particular, the term "workpiece support level" is intended to be understood to mean a level which is generated by a workpiece support face on the handheld tool, that is to say passes through it and is oriented parallel to it. Preferably, the workpiece support face touches the workpiece during a work operation. Preferably, the workpiece support level is oriented parallel to the main working direction. Advantageously, the workpiece support level is oriented perpendicular to a motor-driven work movement by the insertion tool mount. A "locating space" is intended to be understood to mean particularly a space in which the locating apparatus performs locating. Preferably, the locating space is determined by an orientation and configuration of the antennas, by a power of the emitted signal and by signal processing of the received signal. Advantageously, the locating space extends in a direction perpendicular to the workpiece support level beyond the workpiece support level, specifically advantageously at least on a side of the workpiece support level which is remote from the antenna. In particular, the locating space extends more than 1 cm, advantageously more than 2 cm, particularly advantageously more than 5 cm, beyond the workpiece support level.

It is also proposed that the locating space of the locating unit has, on a side of the workpiece support level which faces the antenna, an extent of greater than 1 cm, advantageously greater than 2 cm, particularly advantageously greater than 5 cm, perpendicular to the workpiece support level, as a result of which it is possible to achieve advantageous protection, particularly for a user. Preferably, the extent of the locating space that faces the antenna adjoins the workpiece support level at least to some extent. Alternatively or in addition, the extent of the locating space that faces the antenna could adjoin the workpiece guide means at least to some extent. Preferably, the locating space stretches in a direction perpendicular to the workpiece support level at least as far as a lower dead point of a lower end of a machining region of the insertion tool of the handheld tool. Preferably, the locating space stretches in a direction perpendicular to the workpiece support level at least as far as an upper dead point for an upper end of the machining region of the insertion tool.

In addition, it is proposed that the antenna is arranged behind an insertion tool mount as seen in the main working direction, as a result of which it is a particularly simple matter to monitor a region on which the insertion tool acts next. Alternatively or in addition, a direction region of the antenna could be oriented to a region in front of the insertion tool. A "main working direction" is intended to be understood to mean particularly a direction in which the insertion tool makes working progress. Advantageously, a user moves at least the locating unit in the main working direction at least in one work operation. "Behind . . . as seen in the main working direction" is intended to be understood to mean particularly that first the insertion tool and then the antenna are arranged in the main working direction, particularly on levels that are oriented perpendicular to the main working direction.

In a further refinement, it is proposed that at least the antenna is of planar design. Preferably, at least the first and second antennas, advantageously at least four antennas, are of planar design. Advantageously, the antennas are at least to some extent of integral design, specifically the antennas particularly advantageously have a common ground plane and/or preferably a dielectric of integral design. An "antenna of planar design" is intended to be understood to mean particularly an antenna which has at least one element which, in particular, at least essentially comprises a flat conductive layer. Advantageously, the layer has a thickness of less than 2 mm, preferably less than 0.5 mm, particularly preferably less than 0.1 mm. Preferably, a ratio between the maximum extent of the element and the thickness of the layer is greater than 5, advantageously greater than 10, particularly advantageously greater than 10. Advantageously, the element has a surface area on one level which is greater than 100 mm$^2$, advantageously greater than 250 mm$^2$. Preferably, the antenna has two conductive layers, at least one of which forms the element. Preferably, the layers extend along different, in particular parallel, levels. Advantageously, the layers are arranged at intervals of less than one quarter wavelength, advantageously less than one tenth wavelength, of the transmission signal from one another. Preferably, the planar antenna has a dielectric which is arranged particularly between the layers. Advantageously, the dielectric connects the layers permanently to one another. Preferably, the antenna of planar design is at least to some extent formed by an, in particular, etched printed circuit board. Alternatively or in addition, an insulator, for example a housing portion, can be coated with a conductive face. For this, various methods which appear meaningful to a person skilled in the art are conceivable, such as PVD coating, CVD coating, lacquering, rotation coating, gas-dynamic powder coating and/or cathode sputtering coating. The conductive face is advantageously formed from a metal, but could also be formed from another organic or inorganic substance, such as indium tin oxide. The planar structure means that the antenna is of particularly space-saving and inexpensive design. In addition, an advantageous directional effect can be attained with a little effort.

Furthermore, it is proposed that at least the antenna is fed in a balanced form, which means that it is possible to achieve low crosstalk and, in particular, an advantageous direction region in a simple manner in design terms. An "antenna fed in a balanced form" is intended to be understood to mean particularly an antenna which is provided for the purpose of radiating and/or receiving the signal when fed with two signal elements of the same amplitude and opposite phases, particularly relative to a ground plane. Preferably, the antenna has a balun which is provided for the purpose of adjusting the antennas. Preferably, the balun is in the form of a microstrip component. Alternatively, the antennas could be fed in an unbalanced form. Preferably, at least the first and second antennas are fed in a balanced form.

In addition, it is proposed that at least the antenna is provided for the purpose of sending and/or receiving on a narrowband basis, as a result of which it is possible to achieve signal generation and signal processing which are particularly simple in terms of design, and, in particular, low legal licensing requirements. In particular, the term "narrowband" is intended to be understood to mean having a bandwidth, particularly a 3 dB bandwidth, of less than 10%, advantageously less than 5%, particularly advantageously less than 1%, of a center frequency. Preferably, at least the first and second antennas are provided for the purpose of sending and/or receiving on a narrowband basis. Advantageously, the locating unit has a signal generator which, during operation, produces a particularly narrowband signal. Preferably, a center frequency for the signal is in an ISM band (Industrial, Scientific and Medical Band; ITU-R Regulations 5.138 and 5.150). Particularly preferably, the center frequency is between 2.400 GHz and 2.500 GHz. Alternatively, the antenna could be provided for the purpose of sending and/or receiving on a wideband basis and/or on a plurality of frequencies on a narrowband basis.

In addition, it is proposed that the locating unit has not only the first antenna but also a second antenna, which is provided for the purpose of receiving the signal in a second polarization, which is different than the first polarization of the first antenna, which means that the change of polarization in a reflected signal as a result of an object can be detected particularly easily in design terms. A "polarization" is intended to be understood to mean particularly an orientation of an electrical field component of an electromagnetic field from an antenna, particularly relative to an orientation of an electromagnetic field from another antenna, during operation. Preferably, the first antenna and the second antenna have linear polarization. Alternatively, the antennas could have circular polarization. In particular, "different polarization" is intended to be understood to mean polarizations in which the electrical field components during operation are at an angle relative to one another that is particularly greater than 30 degrees, advantageously greater than 60 degrees, particularly advantageously at least essentially 90 degrees.

Furthermore, it is proposed that the locating unit has at least one compensating means which, during operation, at least partially compensates for crosstalk by a signal from the first antenna on the second antenna, as a result of which it is possible to achieve particularly simple and reliable evaluation of a received signal in design terms. A "compensating means" is intended to be understood to mean particularly a means which combines at least one piece of information from the crosstalk with a signal received particularly from the second antenna. Advantageously, the compensating means combines on an analog basis. Alternatively or in addition, the compensating means could combine on a digital and, in particular, complex basis. Preferably, the compensating means subtracts a value for the crosstalk from the received signal. Preferably, the compensating means compensates not only for the crosstalk from the antenna but also for further crosstalk, such as in lines and/or in baluns. The phrase "during operation" is intended to be understood to mean particularly while the first antenna is sending a signal and particularly while the second antenna is receiving a signal. Preferably, the second antenna receives a reflection, advantageously a reflection with only phase alteration, of the signal sent by the first antenna from a located object and/or particularly from a workpiece. "Crosstalk from the first antenna on the second antenna" is intended to be understood to mean particularly a signal profile via a signal path on the first antenna to the second antenna within at least one portion of the locating unit and advantageously within the antenna. Preferably, the crosstalk is a portion of a power which is output by a signal generator and picked up by a receiver, said portion being independent of the workpiece and/or the located object. A "signal" is intended to be understood to mean particularly a power that is used for locating. In particular, the term "compensate" is intended to be understood to mean that the compensating means particularly substantially reduces an influence by at least the crosstalk on a signal arriving on a receiver.

In addition, it is proposed that the locating unit has at least three antennas, advantageously at least four antennas, with different polarizations, as a result of which particularly reliable detection of an object by virtue of a change of polarization in a reflected signal is a simple manner in design terms. Preferably, an angle between two polarizations that are adjacent in the angle is at least essentially 45 degrees. Advantageously, the locating unit has antennas with a 0-degree, a 45-degree, a 90-degree and a 135-degree polarization. Advantageously, there is an angle of at least essentially 90 degrees between an antenna which is sending in at least one mode of operation and a simultaneously received antenna.

In one advantageous form of the disclosure, it is proposed that the handheld tool apparatus has a computation unit, wherein the antennas have different direction regions and the computation unit is provided for the purpose of ascertaining at least one piece of information about a position of an object from, in particular, received signals from the antennas and parameters of the direction regions, as a result of which it is a simple matter to find the position of an object with particularly little effort. A "computation unit" is intended to be understood to mean particularly a controller having a processor, a memory unit, and/or an operating, control and/or calculation program stored in the memory unit. Preferably, the computation unit is in the form of a digital signal processor. Alternatively or in addition, the computation unit could be in the form of an RISC controller. Preferably, the computation unit is at least to some extent of integral design with a computation unit which controls a drive motor in a handheld machine tool, particularly the jigsaw and/or reciprocating saw. Alternatively, the computation units could be of separate design and, in particular, communicate with one another in at least one mode of operation, particularly by means of analog signals, by means of binary signals and/or advantageously by means of a data bus. A "direction region" is intended to be understood to mean particularly a region to which at least one antenna sends during operation and/or from which at least one antenna receives during operation. Preferably, the direction region is in the form of a space arranged inside a 3 dB beam angle of the antenna. A "parameter of a direction region" is intended to be understood to mean particularly a piece of information which describes a physical arrangement of the direction region, such as an antenna arrangement and/or an antenna orientation. A "piece of information about a position of an object" is intended to be understood to mean at least one piece of information which describes an at least partial arrangement of the object in a region of intersection between two direction regions. An "object" is intended to be understood to mean particularly an object that is different than a workpiece and is intended to be protected from a machining operation, such as a body part, an electrical line, a water line, a bar arranged behind the workpiece and/or other objects which appear meaningful to a person skilled in the art. Preferably, the object has different physical properties than the workpiece.

Furthermore, it is proposed that the locating unit is provided for the purpose of evaluating only a change in a received signal at least during workpiece machining, as a result of which particularly simple evaluation and a particularly simple design for the locating unit are possible. Preferably, the computation unit evaluates the change in the received signal. The phrase "during workpiece machining" is intended to be understood to mean particularly during a movement sequence which causes the workpiece to be cut. Advantageously, the user moves at least the antennas relative to the workpiece during workpiece machining. In particular, the phrase "evaluate a change in a received signal" is intended to be understood to mean that the locating unit merely calculates a difference between the currently received signal and a previously received signal and evaluates the difference. Preferably, the locating unit compares the difference with at least one threshold value. In particular, the locating unit does not detect absolute propagation times for a received signal, for example for the purpose of determining a distance.

In addition, it is proposed that the locating unit defines two different reaction regions, as a result of which a particularly convenient and nevertheless effective reaction to a situation is possible. A "reaction region" is intended to be understood to mean particularly a space in which an object, upon entry, causes a reaction at least from the locating unit. Advantageously, a reaction region is defined as a warning region. Preferably, an object entering this reaction region prompts a, in particular, visual, audible and/or tactile warning to the user, for example by virtue of a main grip vibrating. Advantageously, a reaction region is defined as a protection region. Preferably, an object entering this reaction region prompts a protective measure, such as an insertion tool being stopped and/or other protection that appears meaningful to a person skilled in the art.

The disclosure is also based on a handheld tool, particularly machine tool, having a handheld tool apparatus according to the disclosure, as a result of which a, in particular, safe handheld tool can be achieved particularly easily in design terms. A "handheld tool" is intended to be understood to mean particularly a manually guided unit which is provided for the purpose of interacting with a workpiece, particularly for gauging and/or machining. In particular, the term "handheld machine tool" is intended to be understood to mean a manually guided, motor-operated tool. Preferably, the handheld tool is in the form of a jigsaw and/or reciprocating saw. A "jigsaw and/or reciprocating saw" is intended to be understood to mean particularly a saw which is provided for the purpose of puncturing a workpiece. Advantageously, the jigsaw and/or reciprocating saw has a drive motor and the insertion tool mount. Advantageously, the insertion tool mount mounts the insertion tool on one side during operation. Preferably, the insertion tool is provided for the purpose of sawing curves. Alternatively, the handheld tool could be in the form of another handheld machine tool which appears meaningful to a person skilled in the art, such as particularly a drill, a hammer drill, a saw, a plane, a screwdriver, a milling machine, a grinder, an angle grinder, a garden tool and/or a multifunction tool. Preferably, the handheld tool apparatus is integrated in the handheld tool. Alternatively, the handheld tool apparatus could have a connecting means which is provided for the purpose of making an operative connection for the handheld tool which can be broken by a user. Hence, the handheld tool apparatus could be in the form of an attachment and/or accessory.

BRIEF DESCRIPTION OF THE DRAWINGS

Further advantages emerge from the description of the drawing which follows. The drawing shows six exemplary embodiments of the disclosure. The drawing, the description and the claims contain numerous features in combination. A person skilled in the art will expediently also consider the features individually and combine them into meaningful further combinations.

In the drawing.

DETAILED DESCRIPTION

Figure 1:
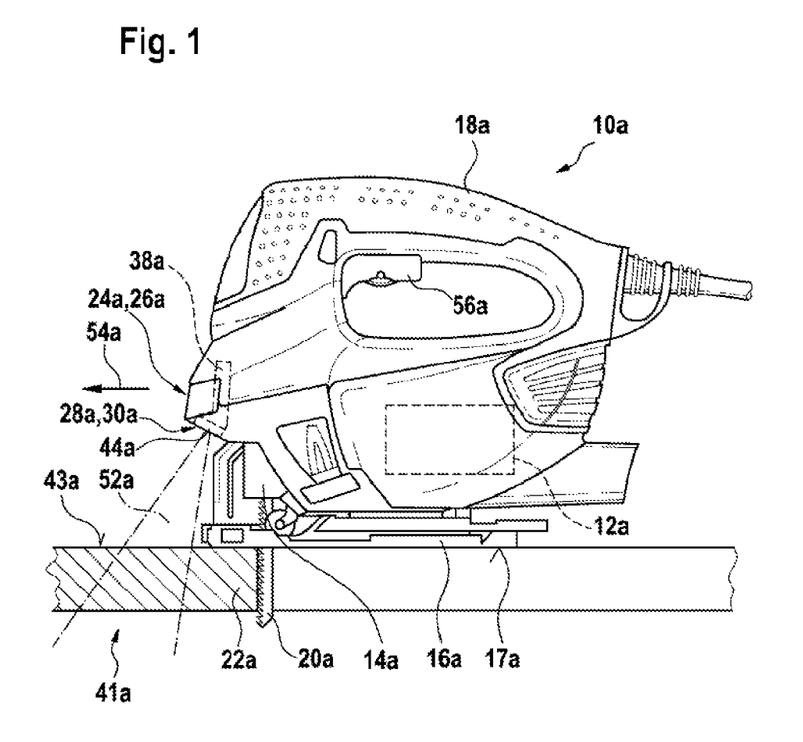
FIG. 1 shows a handheld machine tool according to the disclosure, which is in the form of a jigsaw, having a handheld tool apparatus which has two antennas.

FIG. 1 shows a handheld tool 10a, specifically a handheld machine tool. The handheld tool 10a is in the form of a jigsaw. The handheld tool 10a has a drive motor 12a, an insertion tool mount 14a, a workpiece guide means 16a having a workpiece support face 17a and a main grip 18a. During a work process, the drive motor 12a drives the insertion tool mount 14a, specifically in oscillating fashion. In addition, the drive motor 12a drives an insertion tool 20a back and forth during operation. In a ready state, the insertion tool mount 14a mounts the insertion tool 20a. The insertion tool 20a is in the form of a jigsaw blade. During a work process, when moved by a user, the handheld tool 10a slides over a workpiece 22a on the workpiece support face 17a. The main grip 18a is arranged on a side of the handheld tool 10a which is remote from the workpiece guide means 16a.

Figure 2:
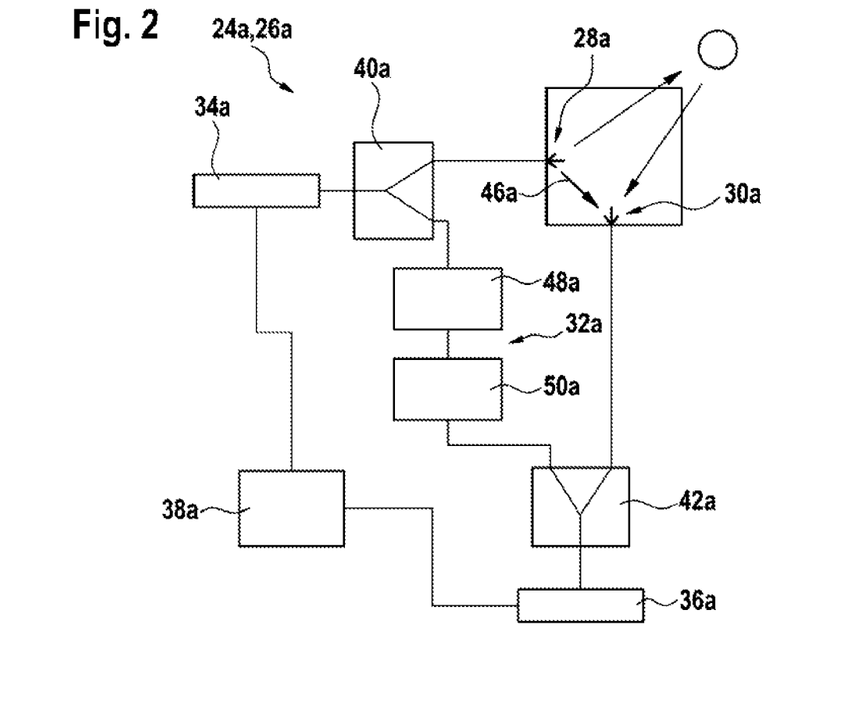
FIG. 2 shows a schematic illustration of the antennas, a signal generator, a receiver and a compensating means of the handheld tool apparatus from FIG. 1.

In addition, the handheld tool 10a has a handheld tool apparatus 24a, shown schematically in FIG. 2. The handheld tool apparatus 24a comprises a locating unit 26a having a first antenna 28a, a second antenna 30a, a compensating means 32a, a signal generator 34a, a receiver 36a, a computation unit 38a, a splitter 40a and a combiner 42a. Filters, impedance converters, baluns, amplifiers, a power supply and other units of the locating unit 26a which appear meaningful to a person skilled in the art are not shown in more detail.

As shown in FIG. 1, in particular, the locating unit 26a has a locating space 41a which penetrates a workpiece support level 43a. To this end, the signal generator 34a produces a narrowband, radio-frequency signal, specifically at 2.4 GHz. The antennas 28a, 30a emit the signal directionally into the locating space 41a. The computation unit 38a regulates an amplitude of the signal. In addition, the computation unit 38a matches a transmission period to a movement by the insertion tool mount 14a, as a result of which it is possible for interference by the insertion tool to be minimized. On a side of the workpiece support level 43a which faces the antennas 28a, 30a, the locating space 41a has an extent of greater than 5 cm perpendicular to the workpiece support level. The antennas 28a, 30a are arranged at an interval from the workpiece support level 43a in a locating direction.

The computation unit 38a is of integral design with a computation unit which controls and/or regulates the drive motor 12a. During operation, the handheld tool apparatus 24a obtains operating energy from an energy source—not shown in more detail—for the drive motor 12a. Alternatively, the handheld tool apparatus 24a could have an independent energy source, particularly a storage battery and/or a battery.

Figure 3:
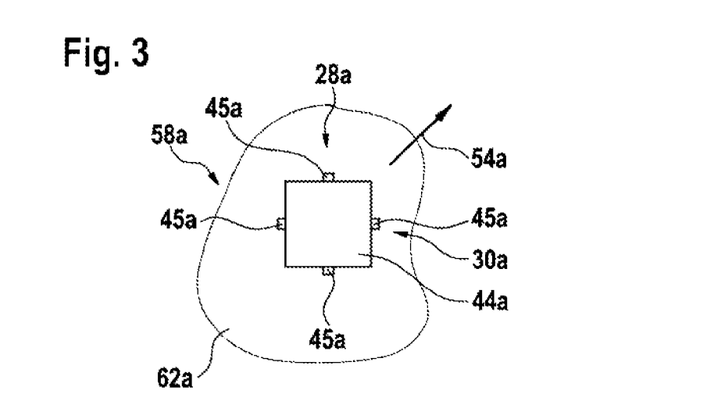
FIG. 3 shows a plan view of the antennas of the handheld tool apparatus from FIG. 1.
Figure 4:
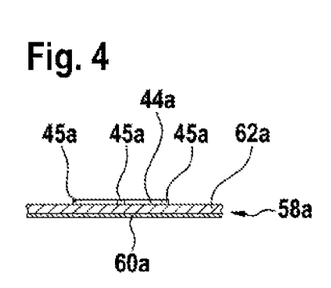
FIG. 4 shows a side view of the antennas of the handheld tool apparatus from FIG. 1.

As FIGS. 3 and 4 show, the antennas 28a, 30a have a common element 44a. The element 44a is in the form of a square, electrically conductive face. The antennas 28a, 30a each have two contact points 45a which make contact with the element 44a. The contact points 45a are each arranged on opposite sides of the element 44a. They are in the form of plated-through holes and are linked by means of striplines. The antennas 28a feed the element 44a in a balanced form. To this end, each antenna 28a, 30a has a balun—not shown in more detail. The second antenna 30a has a polarization that is different than the polarization of the first antenna 28a, specifically the polarization differs by 90 degrees. The element 44a has crosstalk 46a between the first antenna 28a and the second antenna 30a. The element 44a is oriented such that the polarizations of the antennas 28a, 30a are at an angle of 45 degrees to a main working direction 54a.

During a locating process between the signal generator 34a and the first antenna 28a, the splitter 40a decouples a compensating portion from a signal from the signal generator 34a. The compensating portion is smaller than the signal sent, but could also be of equal magnitude or larger. The compensating portion passes through the compensating means 32a. During a locating process, the combiner 42a between the second antenna 30a and the receiver 36a combines a received signal and the compensating portion. The received signal has the crosstalk 46a in this case.

The compensating means 32a has an amplitude control element 48a and a phase control element 50a. The amplitude control element 48a and the phase control element 50a are of adjustable design. The amplitude control element 48a is in the form of an attenuation element. It could alternatively also be in the form of an amplifier. During calibration, the amplitude control element 48a is adjusted such that an amplitude of the compensating portion and an amplitude of the crosstalk 46a are of equal magnitude in the receiver 36a. In addition, during calibration, the phase control element 50a is adjusted such that a phase of the compensating portion and a phase of the crosstalk 46a differ by 180 degrees in the receiver 36a. The phase control element 50a is in the form of a delay line. An amplitude control element and a phase control element could be of integral design, for example in the form of a vector modulator.

The compensating portion largely cancels out the crosstalk 46a in the received signal before the latter reaches the receiver. The calibration of the compensating means 32a takes place during production. Alternatively or in addition, calibration could, in particular, take place shortly before, during or after a work process and/or when initiated by a user, for example by means of feedback. Hence, the compensating means 32a compensates for the crosstalk 46a by the signal from the first antenna 28a on the second antenna 30a.

The first antenna 28a emits the signal in a direction region 52a. During the work process, the user moves the handheld tool 10a in the main working direction 54a. The field from the first antenna 28a penetrates the workpiece 22a in the direction region 52a, which is situated behind—as seen in the main working direction 54a—the insertion tool mount 14a. In addition, the antennas 28a, 30a are arranged behind—as seen in the main working direction 54a—the insertion tool mount 14a. Hence, during locating the locating unit 26a captures objects inside the workpiece 22a and objects outside the workpiece 22a.

The second antenna 30a receives reflections of the sent signal that have an altered polarization. The receiver 36a is in the form of an analog-digital converter. The computation unit 38a evaluates the received signal. To this end, the receiver 36a determines an amplitude for the received signal. Alternatively, the computation unit 38a could evaluate a received signal in terms of absolute value and phase. To this end, the receiver could be in the form of a complex receiver, for example in the form of an IQ receiver. In this case, the computation unit 38a could have a compensating means in the form of a computation routine.

The computation unit 38a has a computation routine which, during a work process, specifically during a movement at least by the antenna relative to a workpiece, evaluates a change in the received signal. The evaluation begins when the computation unit 38a recognizes that a work process is beginning. To this end, the computation unit 38a evaluates a power draw by the drive motor 12a. At that time, calibration could take place. The computation unit 38a subsequently compares an earlier value of the received signal with a current value of the received signal. Alternatively, the computation unit 38a could compare a current value of the received signal with an average and/or filtered value of the signal.

If a difference between the values exceeds a threshold value, the computation unit 38a triggers a reaction. In this exemplary embodiment, the handheld tool 10a warns the user visually. To this end, the computation unit 38a switches on a red light-emitting diode—not shown in more detail—which illuminates a region behind—as seen in the main working direction 54a—the insertion tool 20a. The computation unit 38a switches the warning off when the difference between the values falls back below the threshold value. Alternatively or in addition to the warning, the computation unit 38a could stop the insertion tool mount 14a, particularly after a warning. By way of example, the computation unit 38a could switch off the drive motor 12a, open a coupling between the drive motor 12a and the insertion tool mount 14a, switch off a back-and-forth stroke, actively stop the insertion tool mount 14a by means of the drive motor 12a and/or trigger a braking and/or blocking function. When a user operates an operator control means 56a on the handheld tool 10a, the computation unit 38a could enable the work process to be continued. In this case, a main operator control means could be operated again or the handheld tool 10a could have a separate operator control means for the enabling. Alternatively, the computation unit 38a could enable a machining process after the handheld tool 10a is lifted.

FIGS. 3 and 4 show the two antennas 28a, 30a. The antennas 28a, 30a are of planar design. To this end, the element 44a is formed by a conductive face on an outer side of a printed circuit board 58a. Arranged on another side of the printed circuit board 58a is a ground plane 60a. Between the element 44a and the ground plane 60a, the printed circuit board 58a has a dielectric 62a. The dielectric 62a connects the element 44a and the ground plane 60a mechanically. Alternatively, the element 44a and the ground plane 60a can have a louver arranged between them. The element 44a has a square shape. As a result, the element 44a has a narrowband frequency profile. Hence, the antennas 28a, 30a send and/or receive on a narrowband basis. Alternatively, the element 44a could have a rectangular or other shape which appears meaningful to a person skilled in the art.

FIGS. 5 to 11 show further exemplary embodiments particularly of portions of the disclosure. The descriptions and the drawings which follow are essentially limited to the differences between the exemplary embodiments, and reference can also be made, in principle, to the drawings and/or the description of the other exemplary embodiments, particularly in FIGS. 1 to 4, for components having the same designation, particularly for components having the same reference symbols. In order to distinguish between the exemplary embodiments, the letter a is suffixed to the reference symbols of the exemplary embodiment of FIGS. 1 to 4. In the exemplary embodiments in FIGS. 5 to 11, the letter a has been replaced by the letters b to g.

Figure 5:
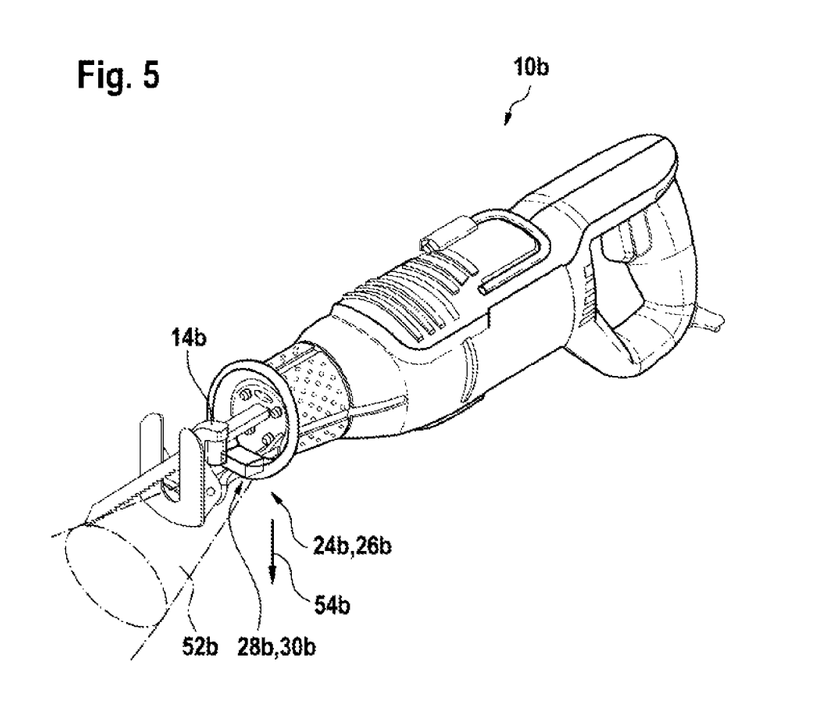
FIG. 5 shows a handheld machine tool according to the disclosure, which is in the form of a reciprocating saw.

FIG. 5 shows a handheld tool 10b which is in the form of a reciprocating saw. The handheld tool 10b has a handheld tool apparatus 24b having a locating unit 26b. The locating unit 26b comprises two antennas 28b, 30b, which are described in the exemplary embodiment in FIGS. 1 to 4. A direction region 52b of the antennas 28b, 30b is arranged behind an insertion tool mount 14b in the main working direction 54b in this case too. The handheld tool 10b has a main extent, which is oriented perpendicular to the main working direction 54b.

Figure 6:
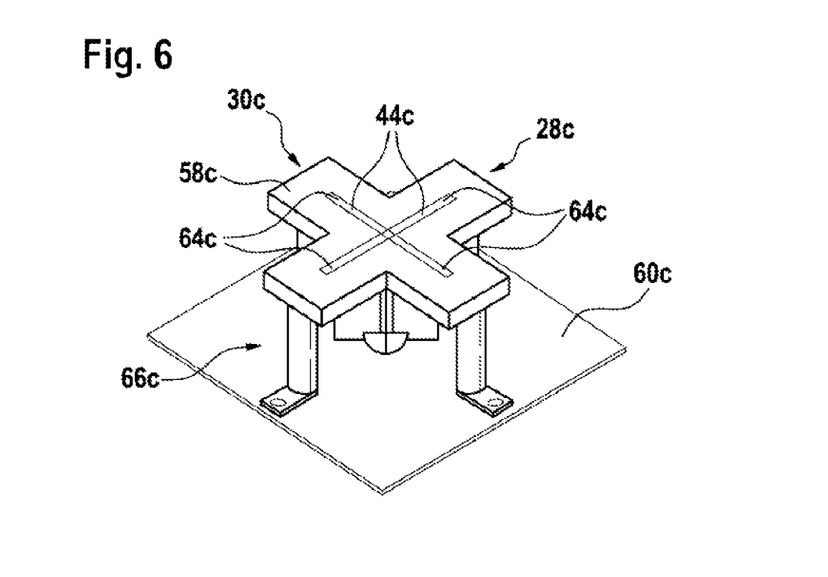
FIG. 6 shows a further exemplary embodiment of the antennas from FIG. 1, which are in the form of a dipole of cruciform design with a bracket.
Figure 7:
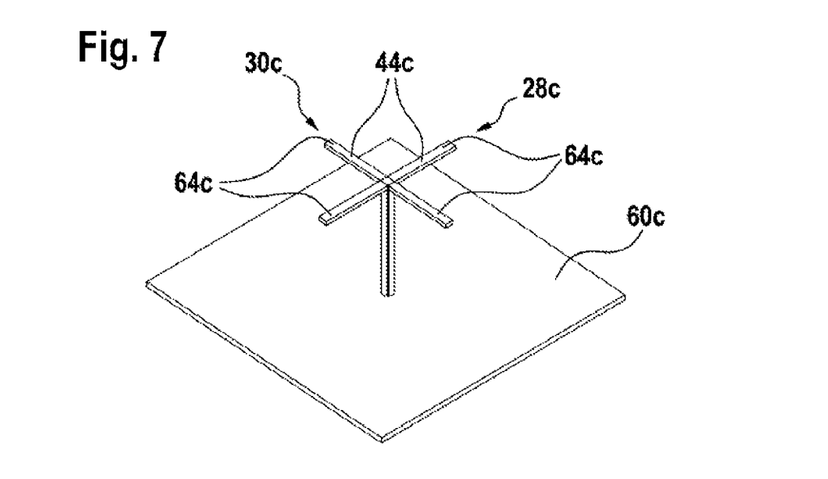
FIG. 7 shows the antenna from FIG. 6 without the bracket.

FIGS. 6 and 7 show two alternative antennas 28c, 30c, each of which is in the form of a dipole antenna. Each antenna 28c, 30c has elements 44c. Each element 44c has two poles 64c in a parallel orientation. Together, the antennas 28c, 30c form a cruciform dipole. A ground plane 60c of the antennas 28c, 30c causes a directional effect, specifically in a direction that points from the ground plane 60c to the elements 44c. FIG. 5 shows a bracket 66c for the antennas 28c, 30c. The bracket is partly in the form of a printed circuit board 58c, specifically the elements 44c are arranged on a printed circuit board. The bracket 66c is formed from a dielectric material. It mounts the elements 44c in an insulating fashion. A length of the elements 44c, a width of the elements 44c, a shape of the elements 44c and an interval between the elements 44c and the ground plane 60c are dependent on a frequency and a bandwidth of a signal that is sent during operation. The antennas 28c, 30c are fed in a balanced form.

Figure 8:
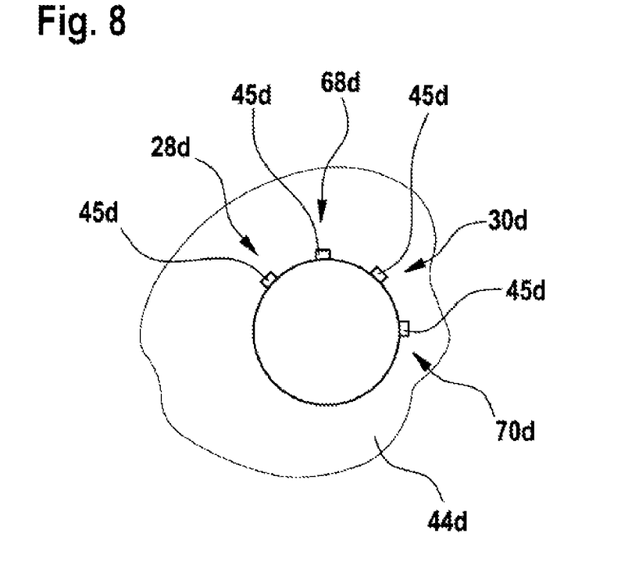
FIG. 8 shows four antennas fed in an unbalanced form with a common round element.

FIG. 8 shows four alternative antennas 28d, 30d, 68d, 70d with a common element 44d. The element 44d is in the form of a circular conductive face. The antennas 28d, 30d, 68d, 70d each have a contact point 45a. The contact points 45d are each arranged at an angle of 45 degrees to the next contact point 45d. The antennas 28d, 30d, 68d, 70d are fed in an unbalanced form. This results in two antenna pairs with two antennas 28d, 30d; 68d, 70d each, which each have an angle of 90 degrees between their polarizations. The antenna pairs have an angle of 45 degrees between their polarizations. Hence, a locating unit has four antennas 28d, 30d, 68d, 70d with different polarizations.

Each one of the antennas 28d, 68d in an antenna pair is connected to a signal generator. Each one of the antennas 30d, 70d in an antenna pair is connected to a receiver. The antennas 28d, 68d alternately emit a signal. In this case, the respective antenna 30d, 70d, which is at an angle of 90 degrees to the sending antenna 28d, 68d, is receiving. This design and this operation also allow objects to be located which have an orientation and/or shape which do not alter a polarization of a reflecting signal in the case of one of the sending antennas.

Figure 9:
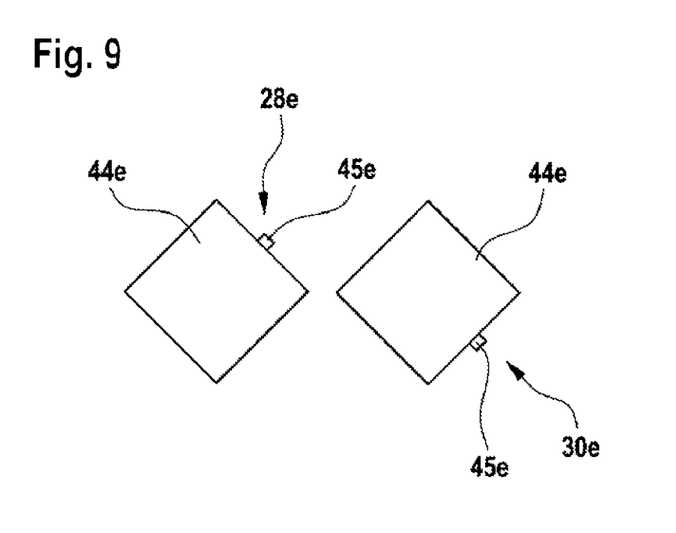
FIG. 9 shows two antennas fed in an unbalanced form with one element each.

FIG. 9 shows two antennas 28e, 30e which are fed in an unbalanced form by means of a respective contact point 45e. The antennas 28e, 30e have elements 44e in separate form. One of the antennas 28e is connected to a signal generator. One of the antennas 30e is connected to a receiver. The antennas 28e, 30e can locate only objects which are arranged in a direction region for both antennas 28e, 30e, as a result of which a locating space can advantageously be arranged, particularly at an interval from the antennas.

Figure 10:
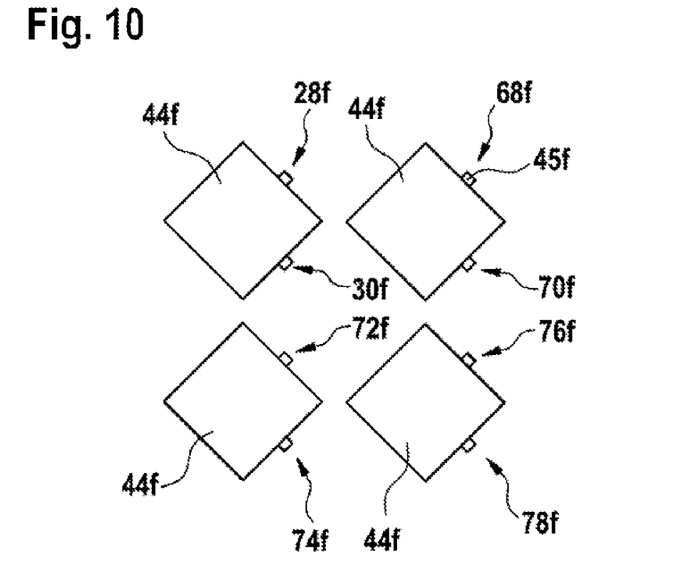
FIG. 10 shows four antennas fed in an unbalanced form with a common round element.

FIG. 10 shows eight antennas 28f, 30f, 68-78f. Two antennas 28f, 30f; 68f, 70f, 72f, 74f, 76f, 78f in each case have a common element 44f and a polarization difference of 90 degrees. The antennas 28f, 30f, 68-78f are fed in an unbalanced form by means of a contact point 45f (provided with a reference symbol only once). Four of the antennas 28f, 30f, 68f-78f in each case have the same polarization. The antennas 28f, 68f, 72f, 76f with the same polarization send during operation and the other antennas 30f, 70f, 74f, 78f with the same polarization receive during operation. The antennas 28f, 30f, 68f-78f are contact-connected in phase. As a result, a particularly narrow beam angle is obtained for a common direction region for the antennas 28f, 30f, 68f-78f. Alternatively, the antennas could be contact-connected out of phase, particularly in adjustable form, as a result of which it is possible to achieve different angles and/or orientations for a direction region. In addition, this principle would alternatively be possible with two or more antennas.

The antennas 30f, 70f, 74f, 78f which receive during operation are each connected to a receiver—not shown in more detail. As a result, as shown particularly in FIG. 11, it is possible to determine information about a position of an object easily in design terms. FIG. 1 schematically shows a side view of two elements 44f and direction regions 52f associated with the antennas 44f. The elements 44f and hence the antennas 28f, 30f, 68f-78f have different direction regions 52f. The direction regions 52f overlap in an overlap region 80f. Alternatively, the antennas 30f, 70f, 74f, 78f which receive during operation could be connected to a common receiver, as a result of which a directional effect of the four antennas can be used easily in design terms.

Figure 11:
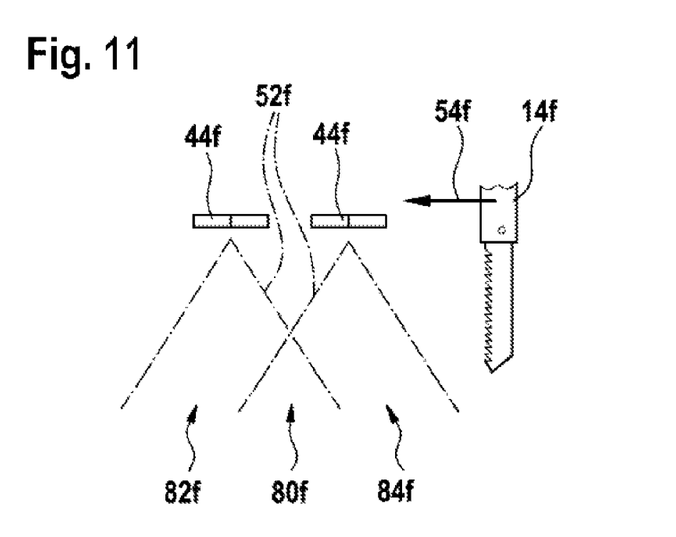
FIG. 11 shows eight antennas fed in an unbalanced form with four elements.

When a reflected signal from an element 44f has changes, an object is entering the direction regions 52f for said element, as a result of the antennas 28f, 30f, 68f-78f being moved relative to the object. When a reflected signal from another element 44f has changes, the object is entering the direction regions 52f for said element. When signals reflected by the object from the two elements 44f have been altered, the object is arranged in the overlap region 80f. As a result of individual sending antennas 28f, 68f, 72f, 76f being switched on and off, further position finding is possible. A computation unit which is described in the first exemplary embodiment has a computation routine which takes the signals from the antennas and parameters of the direction regions 52f for the antennas 28f, 30f, 68f-78f and ascertains information about a position of an object. This principle would alternatively be possible with two antennas or more antennas.

The computation unit defines two different reaction regions 82f, 84f. The reaction regions 82f, 84f are arranged behind an insertion tool mount 14f, behind one another as seen in the main working direction 54f. The computation unit warns the user when an object is arranged in the reaction regions 82f and is at a greater interval from the insertion tool mount 14f. The computation unit stops the insertion tool mount 14f when an object is arranged in the reaction regions 82f and is facing the insertion tool mount 14f. The overlap region 80f could be associated with one of the reaction regions 82f, 84f or with an independent reaction region, for example with a further warning level.

The invention claimed is:

1. A handheld machine tool apparatus comprising:
   a locating unit including at least one antenna, and the locating unit being configured (i) to detect objects outside a workpiece, and (ii) to detect objects inside the workpiece,
   wherein:
   a first antenna of the at least one antenna is configured to receive a signal in a first polarization,
   a second antenna of the at least one antenna, is configured to receive the signal in a second polarization, and
   the second polarization is different than the first polarization.

2. The handheld machine tool apparatus as claimed in claim 1, further comprising:
   a workpiece guide apparatus including a workpiece support level,
   wherein the locating unit defines a locating space configured to penetrate the workpiece support level.

3. The handheld machine tool apparatus as claimed in claim 2, wherein the locating space of the locating unit has an extent greater than 1 cm perpendicular to the workpiece support level on a side of the workpiece support level facing the at least one antenna.

4. The handheld machine tool apparatus as claimed in claim 1, further comprising:
   an insertion tool mount,
   wherein the at least one antenna is located behind the insertion tool mount relative to a main working direction.

5. The handheld machine tool apparatus as claimed in claim 1, wherein the at least one antenna has a planar configuration.

6. The handheld machine tool apparatus as claimed in claim 1, wherein the at least one antenna is fed in a balanced form.

7. The handheld machine tool apparatus as claimed in claim 1, wherein the at least one antenna is configured to, at least one of, send on a narrowband basis and receive on a narrowband basis.

8. The handheld machine tool apparatus as claimed in claim 1, wherein:
   the locating unit further includes at least one compensating apparatus, and
   the at least one compensating apparatus is configured, during operation, to at least partially compensate for crosstalk by an antenna signal from the first antenna on the second antenna.

9. The handheld machine tool apparatus as claimed in claim 1, wherein the locating unit includes at least three antennas having different polarizations.

10. The handheld machine tool apparatus as claimed in claim 1, further comprising:
    a computation unit,
    wherein the antennas of the at least one antenna have different direction regions, and
    wherein the computation unit is configured to ascertain at least one piece of information about a position of an object from position signals from the antennas of the at least one antenna and parameters of the direction regions.

11. The handheld machine tool apparatus as claimed in claim 1, wherein the locating unit is configured to evaluate only one change in a received signal at least during machining of the workpiece.

12. The handheld machine tool apparatus as claimed in claim 1, wherein the locating unit defines two different reaction regions.

13. A handheld machine tool comprising:
    a handheld tool apparatus including a locating unit having at least one antenna, the locating unit being configured (i) to detect objects outside a workpiece, and (ii) to detect objects inside the workpiece,
    wherein:
       a first antenna of the at least one antenna is configured to receive a signal in a first polarization,
       a second antenna of the at least one antenna, is configured to receive the signal in a second polarization, and
       the second polarization is different than the first polarization.

* * * * *